US006560596B1

(12) United States Patent
Margulies et al.

(10) Patent No.: US 6,560,596 B1
(45) Date of Patent: May 6, 2003

(54) MULTISCRIPT DATABASE SYSTEM AND METHOD

(75) Inventors: Benson I. Margulies, Arlington, MA (US); Carl W. Hoffman, Wellesley, MA (US)

(73) Assignee: MultiLingual Domains LLC, Cambridge, MA (US)

( * ) Notice: Subject to any disclaimer, the term of this patent is extended or adjusted under 35 U.S.C. 154(b) by 0 days.

(21) Appl. No.: 09/386,035

(22) Filed: Aug. 30, 1999

Related U.S. Application Data

(60) Provisional application No. 60/098,422, filed on Aug. 31, 1998.

(51) Int. Cl.$^7$ ............................................. G06F 17/30
(52) U.S. Cl. .......................... 707/4; 707/10; 707/100; 709/223
(58) Field of Search ............................. 707/5–9, 1, 4, 707/100, 10; 709/245, 201, 223

(56) References Cited

U.S. PATENT DOCUMENTS

| | | | | |
|---|---|---|---|---|
| 5,446,880 A | * | 8/1995 | Balgeman et al. | 707/9 |
| 5,450,581 A | * | 9/1995 | Bergen et al. | 707/9 |
| 5,678,045 A | * | 10/1997 | Bettels | 707/200 |
| 5,778,373 A | * | 7/1998 | Levy et al. | 707/100 |
| 5,787,423 A | * | 7/1998 | Hirakawa | 707/5 |
| 5,937,163 A | * | 8/1999 | Lee et al. | 709/218 |
| 5,956,711 A | * | 9/1999 | Sullivan et al. | 707/6 |
| 6,182,148 B1 | * | 1/2001 | Tout | 709/245 |

* cited by examiner

Primary Examiner—John Breene
Assistant Examiner—Cheryl Lewis
(74) Attorney, Agent, or Firm—Choate, Hall & Stewart

(57) ABSTRACT

A system and method for storing and retrieving information based upon a string, where the string can be encoded in one of a variety of script encodings. The script encodings can be selected from a set of relevant encodings for the particular application. The system and method are designed to allow the use of legacy information indexed by keys encoded in a single script to merge or join with additional information indexed by keys encoded in multiple additional scripts. In addition, the system and method allow the migration of information from a single national script encoding to a multiple national script encodings or a universal script encoding. The system and method are further directed to an improved domain name system that allows the creation and operation of domain names in a plurality of national encodings and further includes methods for resolving ambiguous encodings.

16 Claims, 9 Drawing Sheets

100

| | KEY & ENCODING FOR KEY | POINTER TO VALUE DATA | |
|---|---|---|---|
| 101(a) | STRING 1, ENCODING 1 | VALUE ID $_1$ | 101(b) |
| 102(a) | STRING 2, ENCODING 2 | VALUE ID $_2$ | 102(b) |
| | STRING 3, ENCODING 2 | VALUE ID $_3$ | |
| | ⋮ | ⋮ | |
| 10N(a) | STRING N, ENCODING Y | VALUE ID$_n$ | 10N(b) |

INDEX TABLE

110

| | VALUE ID | FIELDS OF INFORMATION | |
|---|---|---|---|
| 111(a) | VALUE ID $_1$ | FIELDS $_1$ | 111(b) |
| 112(a) | VALUE ID $_2$ | FIELDS $_2$ | 112(b) |
| | VALUE ID $_3$ | FIELDS $_3$ | |
| | ⋮ | ⋮ | |
| 11N(a) | VALUE ID$_n$ | FIELDS$_n$ | 11N(b) |

VALUE TABLE

FIG. 1

INDEX TABLE (100)

| KEY & ENCODING FOR KEY | POINTER TO VALUE DATA |
|---|---|
| STRING 1, ENCODING 1 | VALUE ID$_1$ |
| STRING 2, ENCODING 2 | VALUE ID$_2$ |
| STRING 3, ENCODING 2 | VALUE ID$_3$ |
| ⋮ | ⋮ |
| STRING N, ENCODING Y | VALUE ID$_n$ |

Row labels: 101(a), 102(a), ..., 10N(a) / 101(b), 102(b), ..., 10N(b)

VALUE TABLE (110)

| VALUE ID | FIELDS OF INFORMATION |
|---|---|
| VALUE ID$_1$ | FIELDS$_1$ |
| VALUE ID$_2$ | FIELDS$_2$ |
| VALUE ID$_3$ | FIELDS$_3$ |
| ⋮ | ⋮ |
| VALUE ID$_n$ | FIELDS$_n$ |

Row labels: 111(a), 112(a), ..., 11N(a) / 111(b), 112(b), ..., 11N(b)

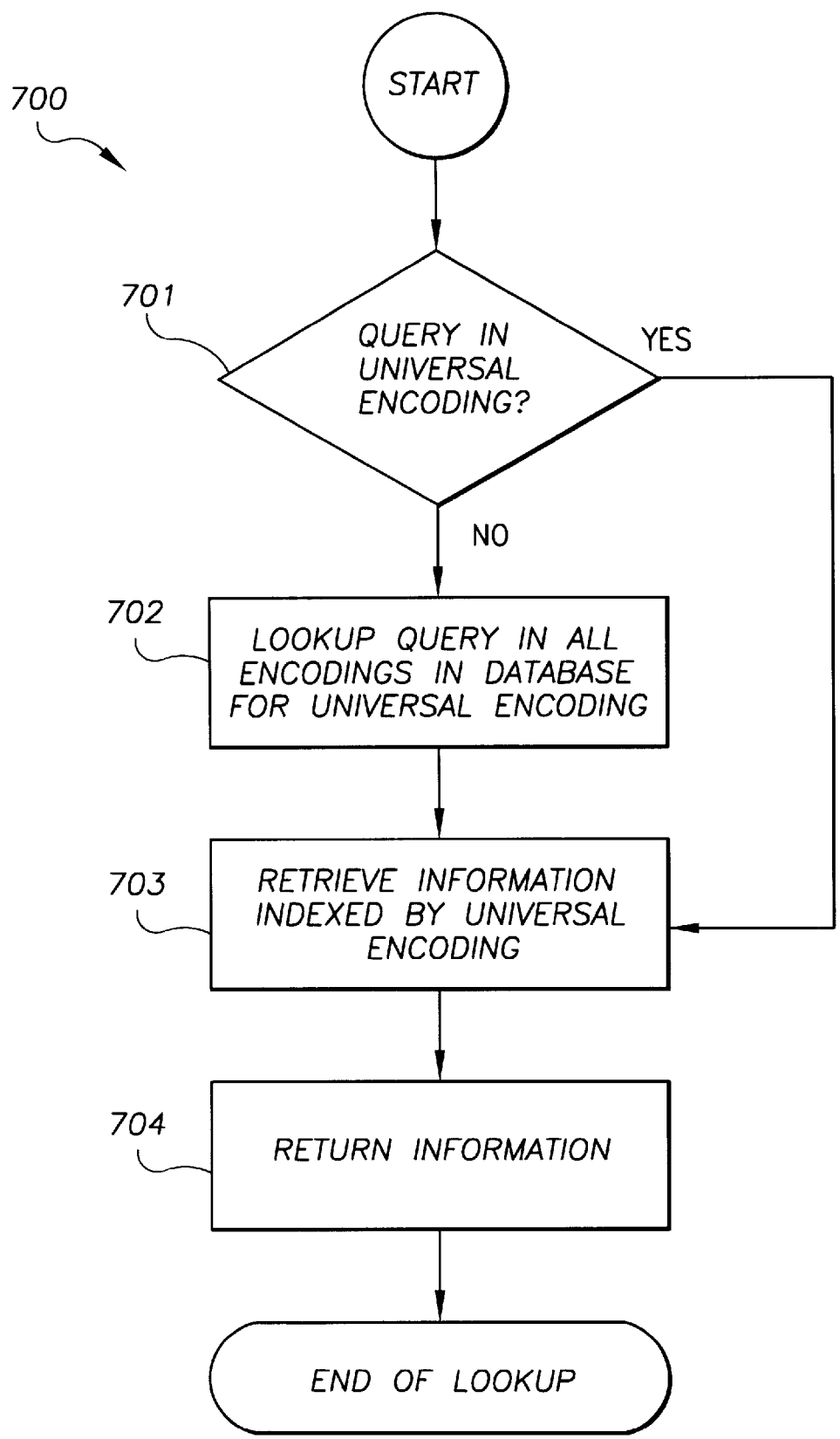

MULTISCRIPT DATABASE SYSTEM AND METHOD

This application claims priority from U.S. Provisional Application No. 60/098,422, filed Aug. 31, 1998.

FIELD OF THE INVENTION

The invention relates generally to the field of art of database systems and more particularly to systems for generating, managing and operating databases in a multi-script environment.

BACKGROUND OF THE INVENTION

Text is stored in computers in a wide variety of encodings. For instance, one of the earliest encodings is ASCII (American Standard Code for Information Interchange,) where alphanumeric characters are represented by a 7-bit numeric value. Thus, as illustrated by the ASCII encoding in Table 1 below, the character 'A' is represented by the 7-bit representation '100 0001' (or hexadecimal value 0x41 as illustrated in table.)

Historically, as illustrated by the ASCII and EBCDIC encodings, computer representations for text were entirely focused on English. Over time, new encodings were designed that allowed the representation of text in many languages with many different character sets. In this document, we use the term 'script' to refer to the representation of one or more languages in terms of a set of written character forms. An 'encoding' is a binary representation that allows text in one or more scripts to be encoded in the memory of a computer.

The many script encodings have grown in a disorganized process; they are not organized into a coherent system. In particular, they are not collectively self-descriptive. In other words, it is not possible to look at an arbitrary stream of data and determine what, if any, text encoding is in use. For example, if a data value of 0x51 representing a text character is received by a computer, and the ASCII and EBCDIC are possible encodings, if the computer does not know which script encoding is being used the computer cannot determine if the data value is referring to the ASCII character 'Q' or the EBCDIC character 'a'. The data value itself does not convey the script encoding utilized in creating the data value. In

TABLE 1

|   | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | NUL | SOH | STX | ETX | EOT | ENQ | ACK | BEL | BS | HT | LF | VT | FF | CR | SO | SI |
| 1 | DLE | DC1 | DC2 | DC3 | DC4 | NAK | SYN | ETB | CAN | EM | SUB | ESC | FS | GS | RS | US |
| 2 | SP | ! | " | # | $ | % | & | ' | ( | ) | * | + | , | - | . | / |
| 3 | 0 | 1 | 2 | 3 | 4 | 5 | 6 | 7 | 8 | 9 | : | ; | < | = | > | ? |
| 4 | @ | A | B | C | D | E | F | G | H | I | J | K | L | M | N | O |
| 5 | P | Q | R | S | T | U | V | W | X | Y | Z | [ | \ | ] | ^ | _ |
| 6 | ` | a | b | c | d | e | f | g | h | i | j | k | l | m | n | o |
| 7 | p | q | r | s | t | u | v | w | x | y | z | { | \| | } | ~ |   |

Another character encoding is the 8-bit EBCDIC (Extended Binary Coded Decimal Interchange Code) utilized in traditional IBM Corporation mainframe computers, where alphanumeric characters are represented by an 8-bit numeric value. Thus, with reference to the EBCDIC encoding illustrated Table 2 below, the character 'A' is represented by the 8-bit representation '1001 0001' (or hexadecimal value 0x91 as illustrated in the table.) Notice that the EBCDIC alphanumeric encodings, illustrated in Table 2, are different from ASCII as illustrated in Table 1.

addition, in most of the encodings, it is not possible to include text in multiple scripts in the same logical document.

The existing art includes several standards that attempt to bring some order into this chaos. The ISO-8859 family of standards provides a series of one-byte-per-character encoding for European languages. Yet these encodings are not self-descriptive. The ISO-2022 standard attempts to allow for a complete, self-descriptive encoding that can be extended to cover all languages. However, this standard is so complex and unwieldy that it is never used in a full,

TABLE 2

|   | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | NUL | SOH | STX | ETX | PF | HT | LC | DEL | GE | RLF | SMM | VT | FF | CR | SO | SI |
| 1 | DLE | DC1 | DC2 | TM | RES | NL | BS | IL | CAN | EM | CC | CU1 | IFS | IGS | IRS | IUS |
| 2 | DS | SOS | FS |   | BYP | LF | ETB | ESC |   |   | SM | CU2 |   | ENQ | ACK | BEL |
| 3 |   |   | SYN |   | PN | RS | UC | EOT |   |   |   | CU3 | DC4 | NAK |   | SUB |
| 4 |   |   |   |   |   |   |   |   |   |   | # | @ | ` | = |   |   |
| 5 |   | a | b | c | d | e | f | g | h | i |   |   |   |   |   |   |
| 6 |   | j | k | l | m | n | o | p | q | r |   |   |   |   |   |   |
| 7 |   | ~ | s | t | u | v | w | x | y | z |   |   |   |   |   |   |
| 8 |   |   |   |   |   |   |   |   |   |   |   |   |   |   |   |   |
| 9 | { | A | B | C | D | E | F | G | H | I |   |   |   |   |   |   |
| A | } | J | K | L | M | N | O | P | Q | R |   |   |   |   |   |   |
| B | \ |   | S | T | U | V | W | X | Y | Z |   |   |   |   |   |   |
| C |   |   |   |   |   |   |   |   |   |   |   |   |   |   |   |   |
| D |   |   |   |   |   |   |   |   |   |   |   |   |   |   |   |   |
| E |   |   |   |   |   |   |   |   |   |   |   |   |   |   |   |   |
| F | 0 | 1 | 2 | 3 | 4 | 5 | 6 | 7 | 8 | 9 | \| |   |   |   |   | EO | self-descriptive, multi-script form. There are many other standards that provide encodings using one, two, or more bytes of data per character to represent text.

Unicode, standardized by ISO as ISO/IEC-10646-1: 1993, provides a representation that can store most of the commonly used languages in a single encoding. Unicode is self-descriptive, so that text encoded utilizing Unicode further includes information indicative of the script. Thus, Unicode overcomes many of the shortcomings of preexisting script encodings. But while Unicode is becoming widespread, there are serious difficulties in simultaneously accommodating currently existing non-Unicode information in many applications. In addition, many of the commonly installed computer systems do not even handle Unicode and can only handle a single encoding at a time. These legacy systems will be with us for a long time.

The problem of multiple encodings is traditionally addressed in software applications by building multiple versions of software systems, one per encoding. One version may be adapted to handle English based scripts while yet another version may handle Chinese based scripts. Each user interacts with the software using the encoding native to their particular computer system.

This model fails to cope with the needs of international business, particularly on the World Wide Web. In the emerging international marketplace, businesses need to present an interface to users in many languages and accept responses from them. Furthermore, as the marketplace becomes more global, the mechanism for information exchange between these divergent markets (and thus divergent computer systems) must be able to handle a wide variety of scripts. Until and unless the majority of users use Unicode-enabled systems and software, these business interfaces must cope with the existing inventory of text encodings.

This problem is particularly acute on the World Wide Web, where the standards for information exchange and presentation have well-known inadequacies in the area of character encodings. For instance, pages of information sent to users can be marked with an encoding so that the text may be correctly displayed. However, responses from the user to the business server are not marked with any encoding at all. This impairs the development of truly worldwide software applications.

As a result, the existing art offers no good means of taking user responses in an arbitrary text encoding and processing them. This problem is particularly acute for database lookups. While existing DBMS systems can store text in all the many national encodings (and, in some cases, Unicode), they provide no assistance for looking up a string in an unknown encoding.

Any solution to the problem of processing user responses in arbitrary encodings has to be compatible with existing databases.

SUMMARY OF THE INVENTION

It is a goal of the present invention to provide a system and method for handling multiple script encodings.

It is a further goal of the present invention to facilitate the use of multiple script encodings in software and database applications.

It is an additional goal of the present invention to provide a system and method for augmenting existing databases to handle multiple script encodings.

It is an additional object of the invention to provide a system and method to manage an Internet Protocol Domain Name Service utilizing a variety of script encodings.

It is a further object of the invention to modify existing Internet Protocol Domain Name Service databases to manage both legacy script encodings and additional non-legacy script encodings.

The present invention is directed to a database system and method for storing information referenced by a name encoded according to at least two scripts. The database system includes a first database containing first information pertaining to the name retrieved from the first database via a first key. The first key contains the name encoded in a first script. The database system further includes a second database containing second information pertaining to the name retrieved from the second database via a second key. The second key contains at least the name encoded in a second script.

The first script encoding may be a national encoding whereas the second script encoding may be a universal script encoding. The database system for claim 1 wherein said second information includes the name encoded in a third script. In addition, the second information may include the name encoded in a canonicalized form. The system may further be adapted where the first database further comprises a plurality of national encoding databases with a corresponding national encoding script, each national encoding database indexed by said name encoded in the national script corresponding to the national encoding database. The present invention further includes methods for constructing the databases.

The present invention is also directed to a domain name system for deriving host information pertain to a host name a first database containing first host information pertaining to said host name retrieved from the first database via a first key. The first key contains at least the host name encoded in a first script. The system further includes a second database containing second host information pertaining to the host name retrieved from said second database via a second key. The second key contains at least said host name encoded in a second script.

The domain name system is further adapted so that the first script encoding is a national script encoding and the second script encoding is a universal script encoding. The domain name system first host information may further include second key information and the second host information may, include information selected from the set comprising internet protocol address, domain server and computer host specifications.

The domain name system may further contain a plurality of national encoding databases, said the key further containing a plurality of national encoding keys containing at least said host name encoded in each of said scripts in a plurality of national script, encodings corresponding to each database of said plurality of national encoding databases. The present invention further includes methods for constructing the databases.

BRIEF DESCRIPTION OF THE DRAWINGS

These and other objects and advantages of the invention will be better appreciated by carefully reading the following detailed description of the presently preferred embodiments of this invention, taken in conjunction with the accompanying drawings in which:

FIG. 1 is a block diagram of a database of the present invention utilizing a table structure for storing information;

FIG. 7 is a flow chart illustrating the steps in a query in an embodiment of the database of the present invention.

DETAILED DESCRIPTION OF THE PREFERRED EMBODIMENTS

Figure 2:
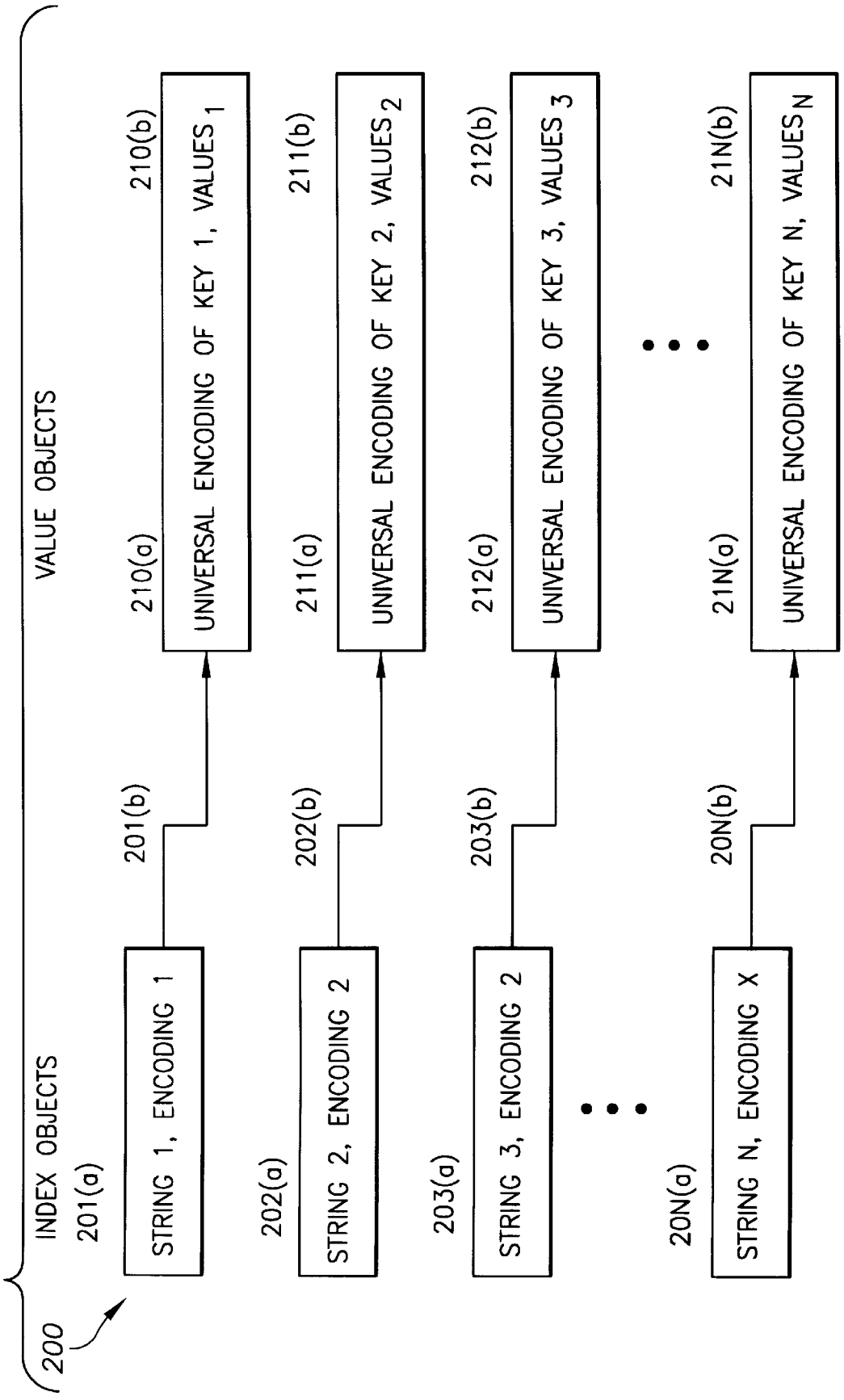
FIG. 2 is a block diagram of a database of the present invention utilizing an object oriented database structure for storing information.

As disclosed herein, the present invention includes an apparatus and method for generating, operating and managing databases for retrieving information according to a plurality of script encodings. While several specific embodiments of the present invention are disclosed herein, those of ordinary skill in the art will recognize that numerous other embodiments are possible as well.

Terminology

The following terms are utilized in the detailed description of the embodiments:

National Encoding—Any text encoding that handles a single script. This includes all of the existing standards except Unicode, since ISO-2022 is never practically used for multi-language processing.

Legacy Encoding—Any text encoding that was present in a database prior to augmentation by the present invention. Typically, this script encoding would be ASCII.

Universal Encoding—Any text encoding that handles most, or all, of the scripts in common use. Unicode/UCS-2 is the current example of this. However, the present invention is adapted to utilize other possible universal encodings such as the proposed UCS-4 encoding.

Key—A string used to access information in a database.

Value ID—The key utilized to Index into the value table.

Ambiguous Key—A key that returns two or more unrelated records of from a database.

Index Table—A table that retains the key encoded in various national encodings. This may be a single table or may actually be implemented by a series of tables creating one effective table. The information retrieved by the key is the value ID.

Value Table—Table that retains the actual information or data fields managed by the database. The value table is indexed by the value ID returned from the index table.

Canonical Form—A base form for a string or key where there may be multiple versions of the key, each version varying by the inclusion of one or more variants. For instance 'A' can be a variant for 'a', and the canonical form would be the string with 'A' whenever 'a' is seen.

Related Encodings—A group of script encodings that are utilized as database encodings in a particular implementation.

General Database Lookup

The present invention is a method that allows a system to accept keys in any encoding and perform a lookup. The result of the lookup is one or more reference strings in a universal encoding, value data for each universal encoding string, and a preferred encoding for sending additional text back to the user. The method makes use of a database structure that provides for lookups in multiple encodings.

The present invention includes several methods of building the database to allow control over the presence of ambiguous keys. Two (or more) keys are ambiguous if the byte representation of one key in some encoding is the same as the byte representation of another key in some encoding.

For instance, suppose you had the following string of characters in the Russian string encoding ISO-8895-5:

TeкCT

This string encoding is represented byte a sequence of bytes that we will call Bytes-A. Now suppose you had the following string of characters in the Latin-1 string encoding ISO-8895-1:

ÂÕÚáâ

This string encoding is represented byte a sequence of bytes that we will call Bytes-B. It turns out that Bytes-A is the same sequence of bytes as Bytes-B. In this example two keys as represented by the sequence of bytes are ambiguous—one cannot determine which of the strings the sequence of bytes represents without knowing which of the two encodings to utilize in decoding the sequence.

In some applications, the appropriate process is to forbid ambiguous keys. In others, it is appropriate to permit ambiguous keys and use one of several methods to choose a preferred result. The present invention further includes methods for handling an ambiguous result in which more than one universal encoding string is found.

The present invention pertains to any database that maps from human-readable keys, such as the names of people, businesses, or computers, to any other information stored in an information processing system.

Queries to the database come in the form of strings to be looked up. Each arriving string may or may not be self-descriptive or accompanied by a marking that identifies its encoding. In addition, for some cases any encoding marking may be reliable, but in other cases it might be suspect. Therefore, matching an encoding description with a stored encoding is also part of the present invention. There are three possible outcomes to matching a two encodings:

1. Unrelated—it is very unlikely that text from one of these encodings is a valid match to text derived from the other.

2. Related—the encodings are not different, but they have a significant overlap. For example, many encodings share the same representation for the basic Latin-1 alphabet (a/k/a ASCII) and simple punctuation marks. If a string arrives marked as ASCII, and matches a string in ISO-8859-1 or ISO-8859-2, then the match is probably relevant.

3. Exact—the encoding identifications are identical.

Database Structure

The algorithm assumes the existence of an efficient database mechanism for looking up a sequence of bytes in an index and retrieving one or more matching records.

The database is built from keys and values. An entry in the database is specified by:

A key representing a string of text in any encoding

The name of the encoding

A set of relevant other encodings, up to and including the set of all known encodings The value indicated by the key. This may be composed of any number of fields of data in any format or representation.

For example, the key might be a person's name, while the value could be their phone number and postal address represented as several fields.

Collectively, these items are called an 'item record'. Item records are stored in the database as a many-to-one structure. On the 'many' side, there are many byte-sequences containing the representation of the key in many encodings. On the one side, there is the representation of the key in the universal encoding and the value data.

In a SQL database, this structure could be represented as two tables, an index table and a value table. FIG. 1 illustrates the two tables. As illustrated, the index table 100 contains records storing the keys (here the string and the encoding for the string) 101(*a*), 102(*a*)–10N(*a*) the value ID's 101(*b*), 102(*b*)–10N(*b*) respectively. The key indexes the table. The value table 110 contains records storing the keys (here the value ID's as found in the index table) 111(*a*), 112(*a*)–11N(*a*) the values 111(*b*), 112(*b*)–11N(*b*) respectively.

In an OODBMS, it could be represented as shown in FIG. 2. As illustrate, the OODBMS contains index objects 200 and value objects 210. The index objects contains records storing the keys (here the string and the encoding for the string) 201(*a*), 202(*a*)–20N(*a*) with references to the related value objects 201(*b*), 202(*b*)–20N(*b*) respectively. These objects are referenced by the key. The value objects 210 contains records storing the keys (here the string and the universal encoding as found in the index objects) 211(*a*), 212(*a*)–21N(*a*) the values 211(*b*), 212(*b*)–21N(*b*) respectively.

Note that in either structure, the set of all the data items containing national encoding strings is generally called the 'index table' while the set of all the data items containing universal encodings and value data is generally called the 'value table'.

Building the Database

The database is built from item records. To add an item record to the database, the algorithm proceeds as follows. Note that there is a special case that is applied to all of the procedures below. If a string uses only characters that are encoded identically in the chosen universal encoding and the presented encoding, it is typically only stored in the database in the universal encoding.

There are three ways to build the database claimed here: zero-conflict, controlled-conflict, and any-conflict.

A zero-conflict database has no ambiguous entries at all. All of the encodings of all of the entries are unique when viewed as byte sequences.

A controlled-conflict database divides up the set of encodings in use into groups of related encodings. Ambiguity is permitted between two items when the ambiguous strings are in two different groups of related encodings, but not when the ambiguous strings are in the same group of related encoding.

An any-conflict database allows items to be entered regardless of conflicts amongst encoded strings. It requires only that the universal encodings be unique.

A zero-conflict database is appropriate when an unambiguous result is required. A controlled-conflict database is appropriate when other information is available that classifies a string as belonging to an encoding group. An any-conflict database is appropriate when an ambiguous result is useable and it is undesirable to forbid ambiguous entries.

Building an Any-Conflict Database

Figure 3:
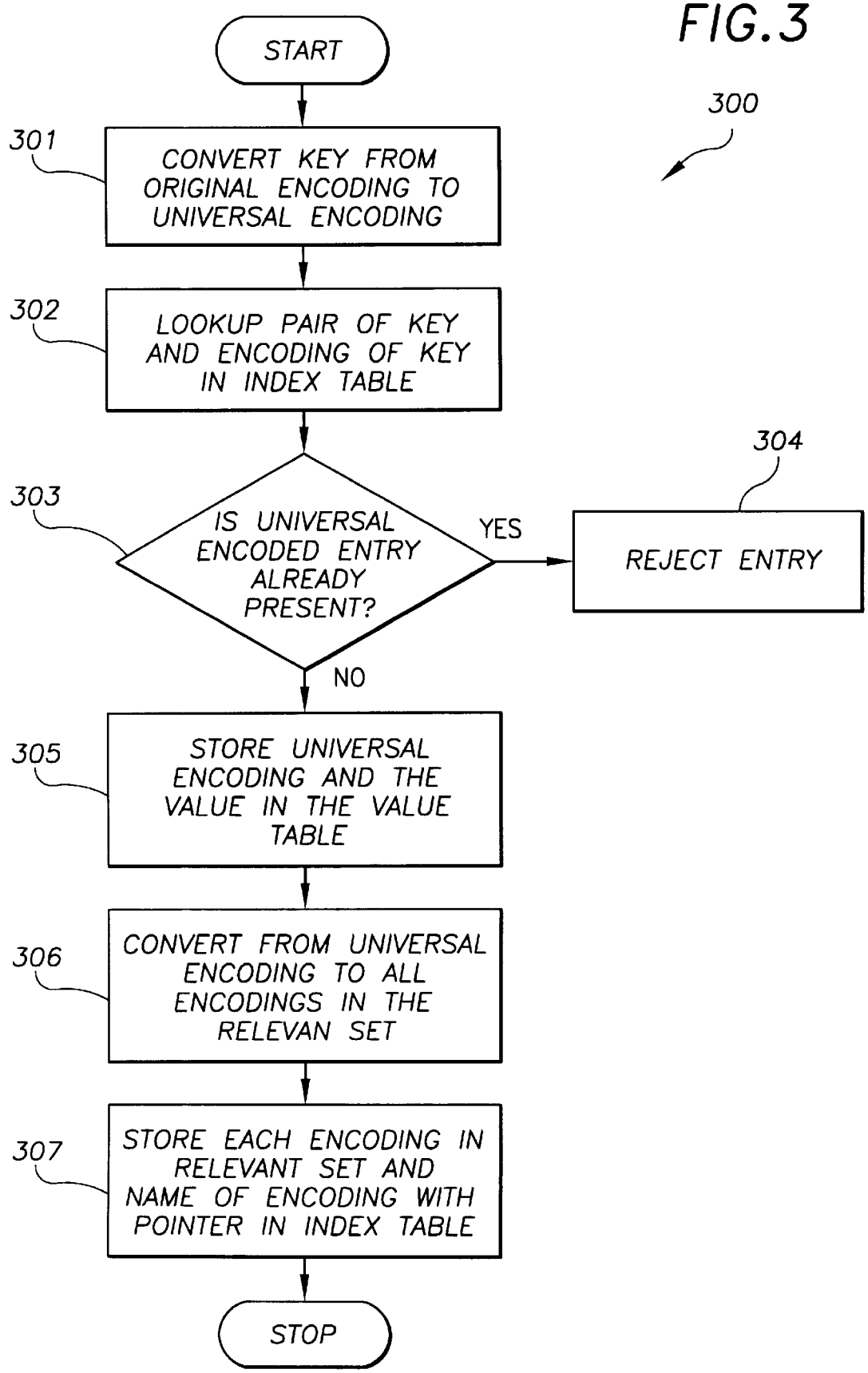
FIG. 3 is a flow chart illustrating the steps for creating an any-conflict database.

FIG. 3 illustrates the flow chart 300 outlining steps for creating an any-conflict database, described as follows:

1. Convert the key from the original encoding to a universal encoding, step 301.
2. Lookup the pair of (universal encoding, name-of-universal-encoding) in the index table, step 302. If it is present, step 303, reject this entry, step 304.
3. Store the universal encoding and the value data in the value table, step 305.
4. Convert from the universal encoding to all of the encodings in the relevant set, step 306
5. Store each encoded form and the name of the encoding so that it points to the universal encoding and value data, step 307.

Building a Controlled-Conflict Database

Figure 4A:
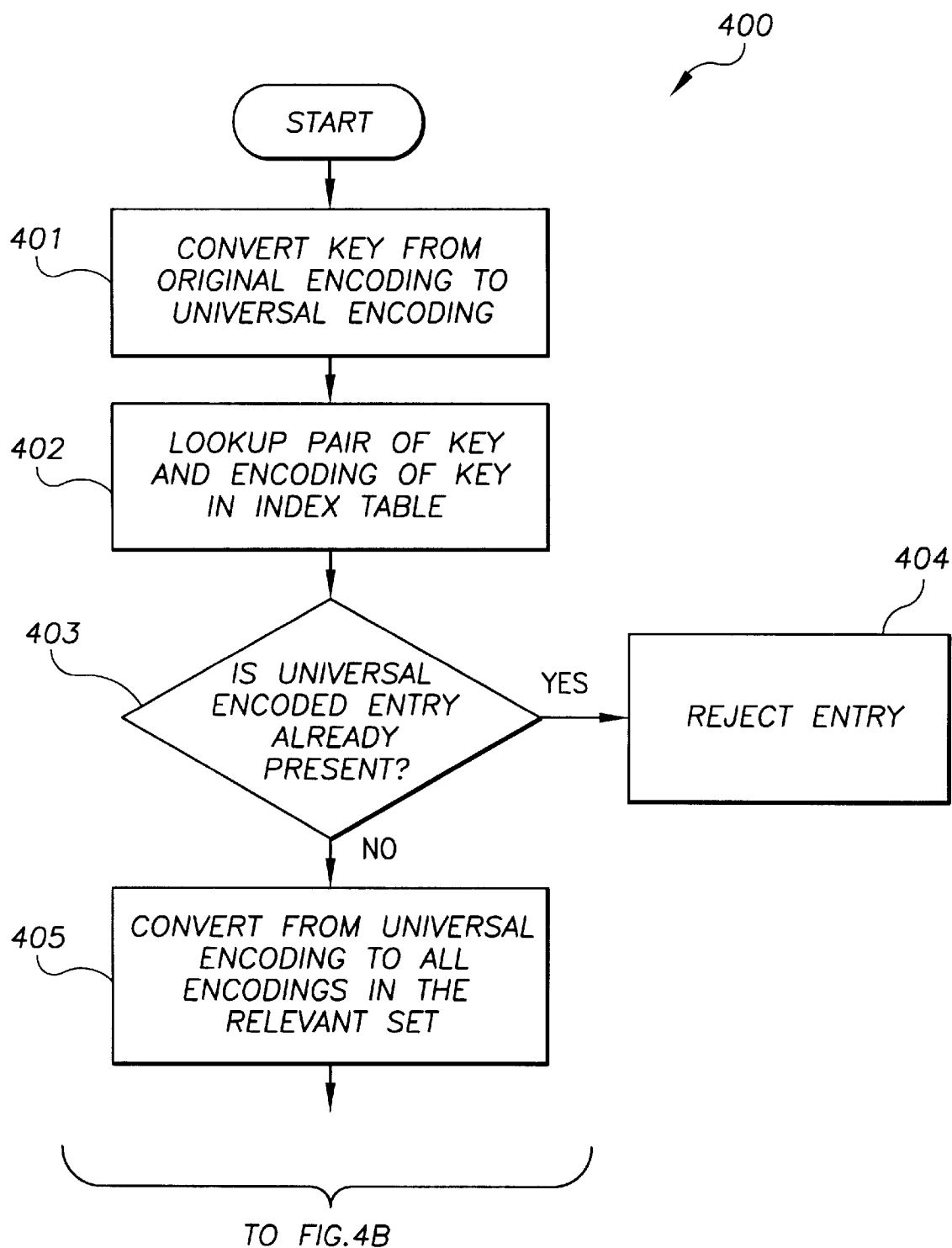
FIG. 4 is a flow chart illustrating the steps for creating a controlled-conflict database.
Figure 4B:
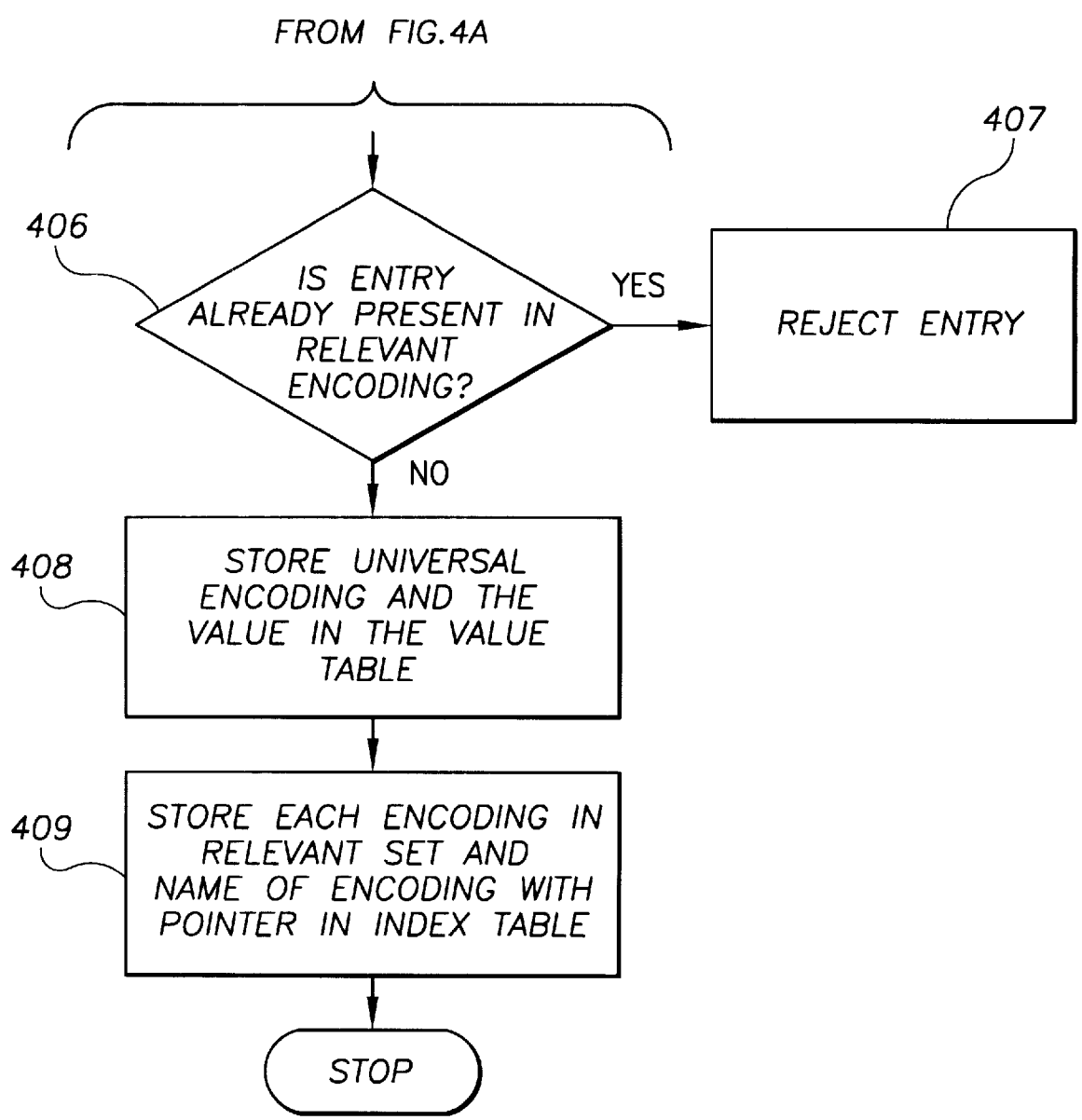

FIG. 4 illustrates a flow chart 400 outlining the steps in building a controlled-conflict database, described as follows:

1. Convert the key from the original encoding to a universal encoding, step 401.
2. Lookup the pair of (universal encoding, name-of-universal-encoding) in the index table, step 402. If it is present, step 403, reject this entry, step 404.
3. Convert from the universal encoding to all of the encodings in the relevant set, step 405.
4. Check for each of the resulting strings in the database, step 406. If any are present and marked with an encoding name from the relevant set, reject this entry, step 407.
5. Store the universal encoding and the value data in the value table, step 408.
6. Store each encoded form and the name of the encoding so that it points to the universal encoding and value data, step 409.

Building a Zero-Conflict Database

Figure 5A:
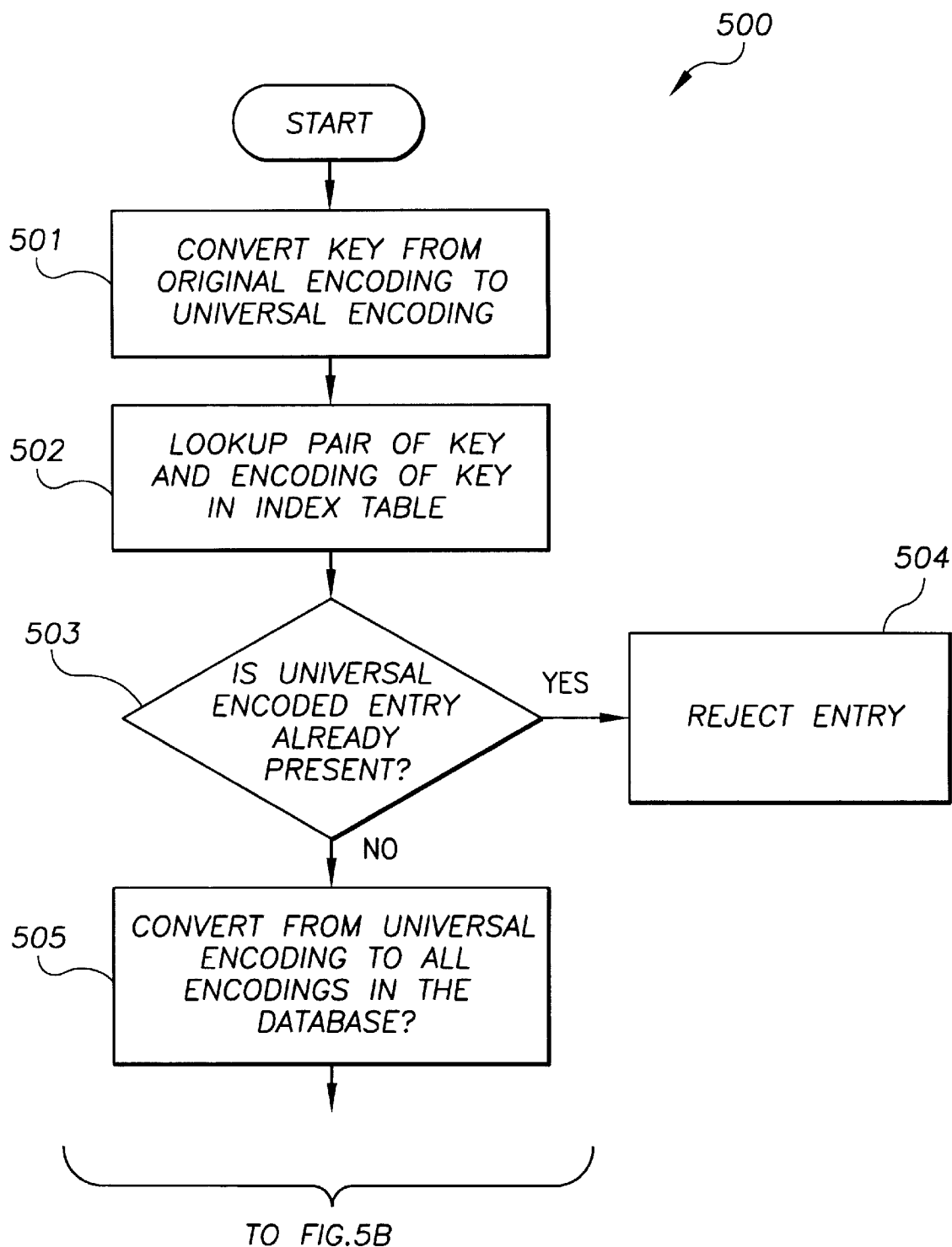
FIG. 5 is a flow chart illustrating the steps for creating a zero-conflict database.
Figure 5B:
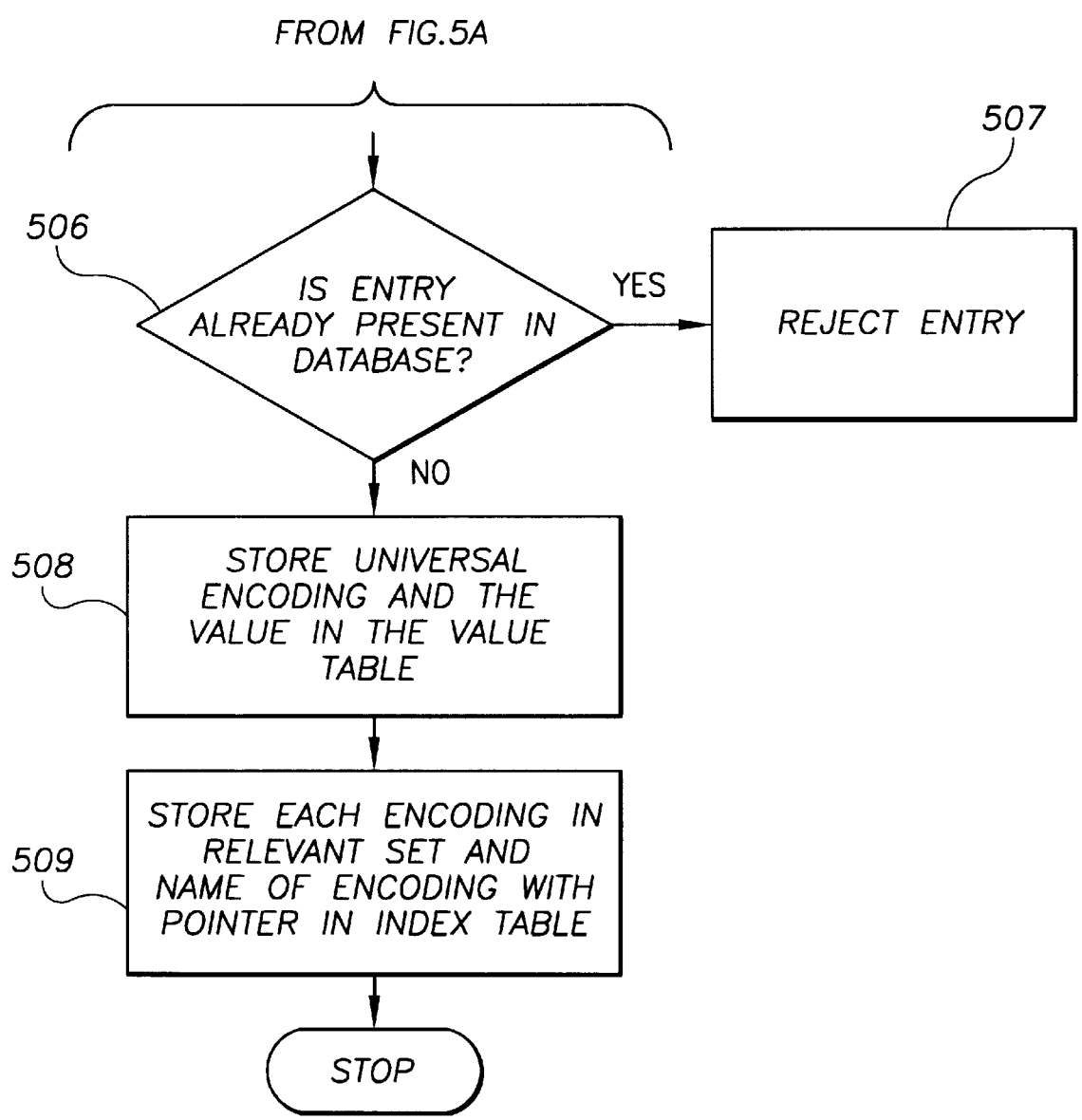

FIG. 5 illustrates a flow chart 500 outlining the steps in building a zero-conflict database, described as follows:

1. Convert the key from the original encoding to a universal encoding, step 501.
2. Lookup the pair of (universal encoding, name-of-universal-encoding) in the index table, step 502. If it is present, reject this entry, step 503.
3. Convert from the universal encoding to all of the encodings in the database, step 504
4. Check for each of the resulting strings in the database, step 505. If any are present in any encoding in the database, step 506, reject this entry, step 507.
5. Store the universal encoding and the value data in the value table, step 508.
6. For the encodings in the relevant set, store the encoded form and the name of the encoding so that it points to the universal encoding and value data, step 509.

Canonicalization of Strings

In some cases it is desirable define equivalence classes of strings in an encoding. This is most useful when end users are likely to enter any one of a number of related strings and expect them to be equivalent. For example, a user might expect any of, "china trade", "ChinaTrade", "chinatrade", or "china-trade" to be equivalent to one another under certain circumstances.

In scripts other then English, the possibilities are broader. Sometimes there are multiple forms of the same character that differ only in their presentation but have very similar semantics. For Chinese, the national encodings and Unicode contain, for example, character code-points for the name of a month with a circle around it.

There are several categories of these variations:
upper and lower case in English
half and full-with characters in some Asian character sets
compatibility characters in Unicode used to ensure that text translated from a national encoding into Unicode looks the same when translated back
presentation forms
visual formatting characters such as dashes, hyphens, blanks, tildes, brackets, and the like.

In building a database, the owner of the data can pick one of three policies:
1. Not to be concerned with variant forms at all. Strings are different even if they different only in a variation.
2. To refuse to store two key strings that differ only in a variation, but to require lookups to match the stored string exactly. The definition of a 'variation' will depend on the circumstances, and may include any of the variations listed above and other related variations., As part of choosing the set of variations, the application must choose a single, reference, representation for text that can be represented in multiple variations. This is called the 'canonical' representation.
3. To refuse to store two key strings that differ only in a variation, but to allow lookups to match strings independent of variations.

For choice 1, nothing changes in the method. For choice 2, there is an additional step at the time that a record is added to the database. After it is translated to the universal encoding, the database is checked for existing keys that differ only by a variation as defined for this application.

For choice 3, to allow lookups to work across variations in a multi-encoding database, the database must be made larger and more complex. When storing the national encoding key strings, the process must store all variations of the universal string translated into all of the relevant encodings that are specified for the record.

For example, consider a database that stores records in:

| Encoding Name | |
| --- | --- |
| ISO-2022-JP | J |
| ISO-2022-KR | |
| JIS-X-0208 | J |
| Shift-JIS | J |
| EUC-KR | |
| ISO-8859-1 | |
| ISO-8859-2 | |

Assume that the database operates by considering the full-width and half-with variations on Japanese characters to be variant encodings of the same underlying characters, and canonicalized them to the full-width forms. All the encoding names marked with 'J' are Japanese encodings.

When a new record arrives for any of the Japanese encodings, it is likely to have a 'relevant' set of all the Japanese encodings, and none of the others. To be concrete, assume that it arrives in Shift-JIS.

To store it, the process would be:
1. Convert the string from Shift-JIS to Unicode.
2. Canonicalize the Unicode.
3. Convert the Unicode to the non-Canonical half-width form.
4. Convert both Unicode forms to all of the database encodings.
5. Check for collisions on all the resulting strings
6. Insert the subset of the strings that are in the 'J' encodings into the list of national encoding strings.

This will rapidly become a large task if there are many possible variations and many possible encodings. On the other hand, for a database concerned only with universal encoding strings, all that is required is to canonicalize strings on their way into the database, store both the canonical form and a 'pretty' form, and canonicalize all input strings for lookup.

Building N-Gram Profiles for Disambiguation

If the database is not zero-conflict, it is possible for a string to match more than one entry. Depending upon the information utilized as string, many different techniques can be used to disambiguate the results. For instance, the present invention can utilize the N-Gram-Based Text Categorization algorithm as taught in "N-Gram-Based Text categorization" by William C. Cavnar and John M. Trenkle, Environmental Research Institute of Michigan, Sep. 30, 1993 whose teachings are incorporated by reference, as a disambiguation technique.

The prior art for N-Grams is to build language profiles using a large corpus of sample text, and then to perform profile matching. To adapt this process to database lookups, we
1. Build profiles using the particular strings in the database
2. Use N-Grams only to distinguish ambiguous cases N-Gram profiles are built after all the strings are stored in the index table. If new encodings are added, the N-Gram profiles must be rebuilt.

Looking Up In the Database

When a string arrives to be looked up, the algorithm proceeds as follows. The incoming string is referred to as the 'byte sequence' and the incoming encoding marking, if any, as the 'presenting encoding.'

Searching the Database
1. Look up the byte sequence in the stored national encodings.
2. If there are no matches, the lookup has failed to find the string.
3. Locate the value and universal encoding information related to each of the matching national encodings. If the string arrived with a presenting encoding, mark each one with the quality of the encoding match, as described.

Processing the Results

If there is a single match, it becomes the result of the lookup. If there was no encoding marking on the input string, or there was a marking and it matched as 'related' or 'matched', the lookup yields the encoding from the index table and the value from the value table. If the encoding is 'unrelated,' the lookup yields no final result.

If there are multiple matches and the string came with an encoding marking, eliminate any results that have 'unrelated' encodings. Thus, if the string came with an encoding marking it as a Japanese script, results that have script encoding for Cyrillic can be eliminated. If none are left, the lookup yields 'no result.' If one is left, it becomes the final result, as above.

If multiple matches are left, the result is ambiguous. The present invention can disambiguate utilizing one or more of the following methods for handling the situation:
1. If they all indicate the same universal encoding and value information, then the value is well defined. One of the following methods may then be used to pick a preferred encoding for future communications with the user.
2. Source information or location information for the user can be used to select a preferred encoding. For example, IP addresses can be mapped to countries in some cases.
3. The technique of N-Gram frequency analysis using profiles built from the database.
4. A global priority-ordering of all the known encodings from most common to least common.

The present invention can utilize the encodings from any of the national encodings or the universal encoding as the preferred encoding for future text sent to the user.

DNS Embodiments of the Present Invention

An additional embodiment of the present invention is directed toward an improved Domain Name System (DNS). The DNS is used to maintain a global registry of resources available to users of the Internet. Nominally, these are names of computer systems that are mapped to Internet Addresses. In practice, these are often 'virtual names' which are picked to be descriptive or attractive to end users.

The DNS system was originally defined and implemented to handle names in a subset of ASCII. In the defined protocol for DNS, the names are represented as sequences of octets. However, current software interprets these as ASCII.

DNS Background

The DNS is a distributed database system created to resolve or translate names into the addressing information necessary for accessing a networked computer. Programs running on computer call name servers constitute the server half of DNS's client-server mechanism. These name servers-contain information about some segment of the database and make it available to clients called resolvers, the other half of the client-server mechanism. Resolvers, which may simply be a library of code on a client computer, create queries and send them across the network to a name server.

The structure of a distributed DNS database is illustrated in FIG. 1. The database is pictured as an inverted tree 600, with the root 601 at the top. Each node, such as 602 or 604, in the tree represents a partition of the overall database—a domain in the DNS. Each domain can be further divided into partitions, such as 603, called subdomains in the DNS. Subdomains are children of their parent nodes.

Every domain is named and is given a label that identifies it relative to its parent domain. Node 603 has a lable of basistech. A domain also has a domain name, which identifies its position in the database. Node 603 has a domain name of basistech.com. In the DNS, the full domain name is the sequence of names encountered walking from the domain to the root, with a "." separating each name.

In the DNS, each domain can be administered by a different organization. Each organization can then break its domain down into a number of subdomains and dole out responsibility to other organizations. Thus, as noted, the DNS is distributed, with multiple servers managing a portion of the distributed database.

Each host on a network has a domain name, which points to information about the host. This information may include IP addresses, information about mail routing, etc. The name assigned to the host need only be unique for the particular domain the host exists within. Unfortunately, the current DNS system only handles names composed in Latin characters, thus precluding the assignment of a name in a different character encoding such as Chinese of Korean.

Various proposals have been submitted to expand the DNS protocols to support domain names written in non-Latin scripts enabling multilingual support. Most of these proposals are based on the use of a new universal character set that includes all of the world's modern scripts. This character set is usually referred to as "Unicode" or by its international standard designation—ISO/IEC 10646:1993-1UCS-2.

The problem with these proposals is that the vast majority of the computers in existence today currently use "legacy" or non-universal encodings for their scripts. Examples of legacy encodings are ISO/IEC 8859-n (where n ranges from 1 to 10) used in Europe and the Middle East, JIS-X-0208-1997 used in Japan, KSC-5601 used in Korea, and GB-2312-80 used in China.

Thus, a "chicken & egg" problem currently exists in that there is no compelling reason to extend DNS to universal character set if no computers are prepared to use it, and visa-versa. The developers of DNS resolvers embedded in operating systems, web browsers, and mail forwarders won't support multilingual DNS until the DNS servers themselves are multilingual and non-Latin domain names are created, and domain name registrars have no incentive to allow non-Latin domain name registration until resolvers can handle such domain names.

DNS Operation

As noted, the DNS is a distributed database of host information. It is designed with a client-server architecture. Each unit of data in the DNS's distributed database is indexed by a name. These names are essentially just paths in a large inverted tree, called the domain name space, illustrated in FIG. 6. The tree has a single root called the root domain. The DNS tree can branch any number of ways at each intersection point, called a node. The depth of the tree is limited to 127 levels.

Each node in the tree is labeled with a simple name of up to 63 characters. As noted, the full domain name of any node in the tree is the sequence of labels on the path from that node to the root, separating each label with a ".". Thus, a domain is simply a subtree of the domain name space. Domains at the leaves of trees generally represent individual hosts, while domains at the interior of a tree can represent both the domain containing the host below and a host with that domain name.

The data associated with a domain are contained in resource records. Resource records come in several types, which correspond to the different varieties of data that may be stored in the domain name space.

The distributed nature of the DNS is achieved through delegation. Delegating domains breaks the task of managing the domain name space in smaller tasks and distributes these tasks to certain hosts across the network.

A domain can be divided into subdomains. Each subdomain's set of data (the information managed by the DNS with respect to the subdomain) can be delegated to name server. In fact, the subdomain can further contain children subdomains, with each child subdomain information managed by the same or different name servers. Each name server is responsible for storing information about a portion of the domain name space.

Thus, the information for the domain name space is distributed across a number of name servers on the network. In addition, as each name server is on the network, they can freely exchange information with one another as needed. Finally, as each name server is a separate computer, it can implement its own mechanism for storing and retrieving domain information.

Figure 6:
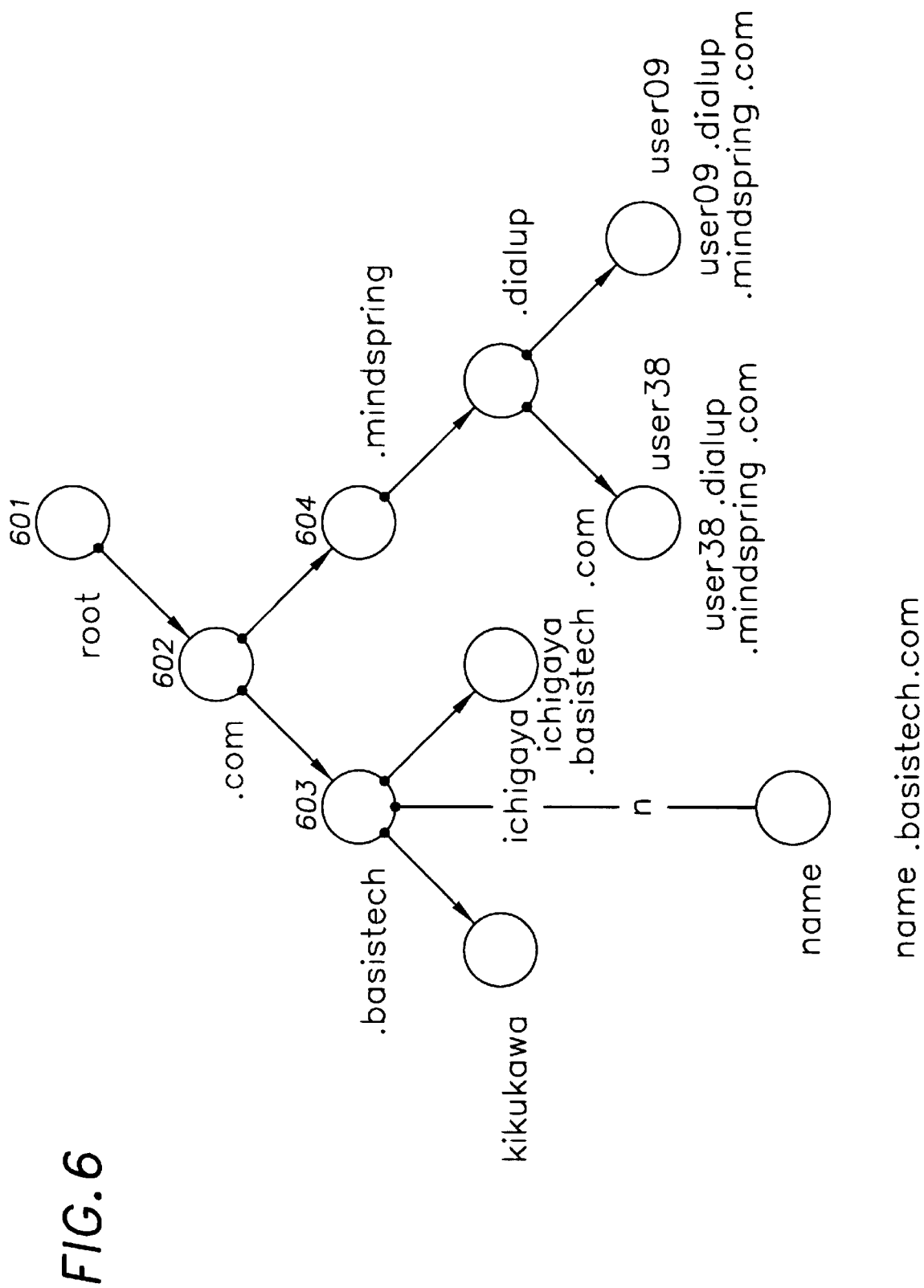
FIG. 6 is a block diagram of the domain name system.

A query from a resolver is handled by the name servers on the network. With reference to FIG. 6, say machine kikukawa.basistech.com wishes to contact user09.dialup.mindspring.com, the following steps are an example of the steps taken in deriving the network information for user09.dialup.mindspring.com 1. The computer kikukawa.basistech.com requests the address of user09.dialup.mindspring.com from the local name server (in this case name.basistech.com).
2. The name server name.basistech.com contacts the root name server and asks for the address for user09.dialup.mindspring.com. The root name server passes the best knowledge it has back to name.basistech.com, in this case referring the server on to contact the corn name server.

3. The name server name.basistech.com contacts the corn name server and asks for the address for user09.dialup.mindspring.com. The corn name server passes the best knowledge it has back to name.basistech.com, in this case referring the server on to contact the mindspring.com name server.
4. The name server name.basistech.com contacts the mindspring.com name server and asks for the address for user09.dialup.mindspring.com. The mindspring.com name server passes the best knowledge it has back to name.basistech.com, in this case referring the server on to contact the dialup.mindspring.com name server.
5. Finally, the name server name.basistech.com contacts the dialup.mindspring.com name server and asks for the address for user09.dialup.mindspring.com. The dialup.mindspring.com name server actually knows the information requested and passes it back to name.basistech.com.
6. The basistech.com name server returns the information to the resolver kikukawa.basistech.com, which then uses the information to contact user09.dialup.mindspring.com.

Modification to DNS

The present invention extends the DNS by modifying the DNS database to allow additional encodings. To apply this technique, a zero-conflict database is built and utilized by a name server responsible for a domain. This zero-conflict database handles incoming DNS queries.

An important aspect of is the ability to handle the preexisting legacy names found in the current DNS database. This new database starts by taking all the existing registration information from the existing database for this domain and treating it being encoded in the national encodings relevant to the ASCII encoding.

A set of 'relevant' encodings is selected for this domain. While one could provide all encoding utilized for all domains, in practice this is unnecessary. Most domains tend to utilize a small subset of the encodings for obvious reasons. For instance, in Japan the relevant encodings are directed to the scripts utilized in the orient. The set may contain EUC, ISO-2022-JP, Shift-JIS, JIS-X-0208, and JIS-X-0201. One would typically not find domain names encoded in the scripts utilized by Middle East countries, and so those scripts would not be present in the relevant set. Typically, the set of relevant encodings will vary depending on the domain.

This provides benefits to the operation of the DNS. First, it reduces the database size and thus speeds the registration process. Second, it reduces spurious conflicts—it would be inefficient to eliminate a Japanese name on a name server in Japan because of a potential conflict of a name in a Cyrillic encoding.

In addition, a DNS server can serve as a cache, maintaining a local copy of information retrieved from other remote servers. Cached information can be provided in response to a query from a resolver. Thus, a DNS server not only can return information retrieved from the database for the domain that DNS server has authority over, but also information that was retrieved during prior queries and kept as a local copy as an optimization. This is further described in chapters 1 and 2 of "DNS and Bind" by Paul Albitz and Cricket Liu, O'Reilly & Associates, Inc. 1997, whose teachings are incorporated by reference.

Registration of Information

The creation of domain information in the present invention, using the technique above, will store each existing and new registration in Unicode as well as in each of a set of common Internet encodings (i.e. the set of encodings that are currently frequent use on the internet, typically those found in RFC1700 found at http://www.cis.ohio-state.edu/htbin/rfc/). New registrations may not conflict with any existing registration in the intersection of their respective desired national encodings.

The resulting DNS registration will have a Unicode entry represented in UTF-8 for each domain as well as a set of national encoding entries.

Each domain will choose its set of relevant national encodings. For example, a domain in common use worldwide will use a very broad set of encodings, while domain that is used for a particular geographical region, say Japan as discussed above, will select a smaller set of encodings relevant to the area.

Lookup of Information in Database

If a domain server allows registration of multi-language names, the server for that domain implements the following method. Currently, the existing DNS protocol has no provision for marking the encoding of a name in a query. It is anticipated, though not required for all embodiments of the invention, that a future version of the protocol will distinguish queries in a single universal encoding (most likely UTF-8) from legacy queries in, nominally ASCII.

There are many, many, many systems on the Internet that run DNS servers. It will take a very long time for all of them to make use of this database lookup scheme when translating from names to addresses. In the interim, there will be some language-aware servers (DNS servers utilizing one or more embodiments of the present invention,) and other language-unaware servers (those DNS servers that utilize software like the existing DNS system).

In other words, a language-aware server is one that uses the previously described database lookup method to take a host name and attempt to translate it into a host address. A language-unaware server is one that operates like the existing method that assumes the name is ASCII and look it up be a simple match in the database.

As a result, all domains in the system can be divided into two categories: multiple-encoding enabled domains (corresponding to domains whose name servers are language-enabled) and non-multiple-encoding domains (corresponding to domains who name servers are language-unaware).

To set up a domain as supporting multiple encodings (e.g. the domain co.jp), one must build that domain's database utilizing an embodiment of the present invention, and have the domain server for that domain use an embodiment of the present invention for lookup. In other words, the domain server must be language-aware and the database must be constructed with the proper encoding information.

As noted, a name server may also behave as a cache, temporarily storing previous name translations. Therefore, a language-unaware server acting as a cache may find itself in the path of a query from a system using a national encoding to another server that is language aware. The language aware server operates like a language-unaware server in that it takes the sequence of byte values and looks in its cache table for a match. The cache is not organized to monitor encodings; rather it simply returns data indexed by the byte values of the string.

With reference to FIG. 7, if a language-aware server receives a query in universal encoding, step 701, the server looks it up in the database specifying the byte string from the query and the universal encoding name, step 703. Because the query came in with the script encoding specified (universal), the query is a straightforward lookup of the universal encoding of the name. There can be either zero or one matching results returned, step 704. In other words, the server works just as servers work today, except that the data happens to be in UTF-8 rather than ASCII.

If a language-aware server receives a query that is not in universal encoding, step 701, it does a database lookup as previously described. The server queries the various index tables for the relevant national encodings, step 702, and based upon the results of that lookup queries the value table for the appropriate data pertaining to that name, step 703. Because the database is zero-conflict, only one result is possible.

If a language-unaware server receives a query that is not in universal encoding, the situation is as it is today. Except in the very unlikely case that a string in one encoding happens to match an unrelated string in a different encoding, the lookup fails. This should rarely happen if the system utilizes a zero conflict database.

If a language-unaware server is serving as a cache, it will treat different encodings of the same name as different names that happen to map to the same data. This is harmless. Because the cache treats the sequences of byte values representing a string as the key into the cache, each representation of a name in an encoding will have a separate cache entry. Thus, while the cache cannot utilize the information stored in a first encoding when that same name is queried in a second encoding (e.g. share the data between the two encodings), it will operate properly by performing the proper resolution of the name in the second encoding.

Thus, utilizing the present invention the DNS can be expanded to handle names in new national script encoding while only requiring a finite number of name servers to be modified to implement the present method. In addition, the present invention allows the transition from ASCII script encodings to a universal encoding while still managing the legacy data found within the system.

Although the present invention has been described with reference to certain preferred embodiments, many other embodiments will be apparent to those with skill in the art. For example, the encodings utilized can be extended or modified, the information stored in the databases can be extended, and the structure of the database tables can be changed to utilize more or fewer tables. Therefore, the spirit and scope of the appended claims should not be limited to the description of the preferred versions contained herein.

What is claimed is:

1. A database system for storing information referenced by a name encoded according to at least two scripts comprising:

a first database containing first information pertaining to said name, said first information retrieved from said first database via a first key, said first key comprising at least said name encoded in a first script, wherein said first script encoding is a national script encoding; and a second database containing second information pertaining to said name, said second information retrieved from said second database via a second key, said second key comprising at least said name encoded in a second script.

2. A database system for storing information referenced by a name encoded according to at least two scripts comprising:

a first database containing first information pertaining to said name, said first information retrieved from said first database via a first key, said first key comprising at least said name encoded in a first script; and a second database containing second information pertaining to said name, said second information retrieved from said second database via a second key, said second key comprising at least said name encoded in a second script, wherein said second script encoding is a universal script encoding.

3. A database system for storing information referenced by a name encoded according to at least two scripts comprising:

a first database containing first information pertaining to said name, said first information retrieved from said first database via a first key, said first key comprising at least said name encoded in a first script; and a second database containing second information pertaining to said name, said second information retrieved from said second database via a second key, said second key comprising at least said name encoded in a second script, wherein said second information includes the name encoded in a third script.

4. A database system for storing information referenced by a name encoded according to at least two scripts comprising:

a first database containing first information pertaining to said name, said first information retrieved from said first database via a first key, said first key comprising at least said name encoded in a first script; and a second database containing second information pertaining to said name, said second information retrieved from said second database via a second key, said second key comprising at least said name encoded in a second script, wherein said second information includes the name encoded in a canonicalized form.

5. A database system for storing information referenced by a name encoded according to at least two scripts comprising:

a first database containing first information pertaining to said name, said first information retrieved from said first database via a first key, said first key comprising at least said name encoded in a first script;

a second database containing second information pertaining to said name, said second information retrieved from said second database via a second key, said second key comprising at least said name encoded in a second script; and wherein said first database further comprises a plurality of national encoding databases with a corresponding national encoding script, each national encoding database indexed by said name encoded in the national script corresponding to the national encoding database.

6. A method of creating a database system for storing information referenced by a text name encoded according to a national script encoding comprising the steps of:

receiving the text name, the value information and the at least one national script encoding;

checking a first database for a first conflict, said first database adapted to contain records indexed according to name entries encoded in a universal script encoding, said first conflict occurring if said text name encoded in said universal script encoding corresponds with a record in said first database; and rejecting said text name if said first conflict exists, otherwise executing the steps of checking a second database for a second conflict, said second database adapted to contain records indexed according to name entries encoded in said national script encoding, said second conflict occurring if said text name encoded in said national script encoding corresponds with a record in said second database, rejecting said text name if said second conflict exists, otherwise executing the steps of entering said value information in said first database in a record indexed according the text name encoded in said universal script encoding, and entering information related to said text name encoded in said universal script encoding in said second database in a record indexed according the text name encoded in said national script encoding.

7. A method of creating a database system for storing information referenced by a text name encoded according to a plurality of selected national script encodings comprising the steps of:

receiving the text name, the value information and the plurality of national script encodings;

checking a first database for a first conflict, said first database adapted to contain records indexed according to name entries encoded in a universal script encoding, said first conflict occurring if said text name encoded in said universal script encoding corresponds with a record in said first database; and rejecting said text name if said first conflict exists, otherwise executing the steps of checking a plurality of second databases for a second conflict, each of said second databases adapted to contain records indexed according to name entries encoded in one of a set of database national script encodings, said second conflict occurring if said text name encoded separately by each encoding member in said set of database national script encodings corresponds to a record in any of said plurality of second databases indexed according to name entries encoded by said encoding members, rejecting said text name if said second conflict exists, otherwise executing the steps of entering said value information in said first database in a first record indexed according the text name encoded in said universal script encoding, entering a second record, said second record containing information related to said text name encoded in said universal script encoding, in each database in said plurality of second databases that corresponds to each script encoding in said selected script encodings indexed according the-text name encoded in said corresponding script encoding.

8. A method of creating a database system for storing information referenced by a text name encoded according to a plurality of selected national script encodings comprising the steps of:

receiving the text name, the value information and the plurality of national script encodings;

checking a first database for a first conflict, said first database adapted to contain records indexed according to name entries encoded in a universal script encoding, said first conflict occurring if said text name encoded in said universal script encoding corresponds with a record in said first database; and rejecting said text name if said first conflict exists, otherwise executing the steps of checking a portion of a plurality of second databases for a second conflict, each of said second databases adapted to contain records indexed according to name entries encoded in one of a set of database national script encodings, said second conflict occurring if said text name encoded separately by each selected nation script encodings corresponds to a record in any of said portion of said plurality of second databases indexed according to name entries encoded by each selected national script encodings, rejecting said text name if said second conflict exists, otherwise executing the steps of entering said value information in said first database in a first record indexed according the text name encoded in said universal script encoding, entering a second record, said second record containing information related to said text name encoded in said universal script encoding, in each database in said plurality of second databases that corresponds to each script encoding in said selected script encodings indexed according the text name encoded in said corresponding script encoding.

9. A method of creating a database system for storing information referenced by a text name encoded according to a plurality of selected national script encodings comprising the steps of:

receiving the text name, the value information and the plurality of national script encodings;

checking a first database for a first conflict, said first database adapted to contain records indexed according to name entries encoded in a universal script encoding, said first conflict occurring if said text name encoded in said universal script encoding corresponds with a record in said first database; and rejecting said text name if said first conflict exists, otherwise executing the steps of entering said value information in said first database in a first record indexed according the text name encoded in said universal script encoding, entering a second record in a portion of a plurality of second databases, each of said second databases adapted to contain records indexed according to name entries encoded in one of a set of database national script encodings, said second record containing information related to said text name encoded in said universal script encoding, said second record entered in each database in said plurality of second databases that corresponds to each script encoding in said selected script encodings, said second record indexed according the text name encoded in said corresponding script encoding.

10. The method of claim 6,7,8 or 9, wherein the step of receiving the text name further comprises canonicalizing the text name so that the text name contains multiple equivalent encodings.

11. A method for retrieving target values stored in a database system comprising the steps:

receiving a text name;

generating a plurality of keys from said text name, said plurality of keys generated by at least encoding said text name with each member encoding of a set of nation script encodings;

retrieving from a plurality of second databases containing location information indexed according to script encodings, each second databases in said plurality of second databases utilizing a different script encoding, any location information indexed via said plurality of keys;

retrieving from a first database containing values indexed according to at least a universal script encoding, the value associated with said text name, said universal encoding and said location information.

12. A domain name system for deriving host information pertaining to a host name comprising:

a first database containing first host information pertaining to said host name, said first host information retrieved from said first database via a first key, said first key comprising at least said host name encoded in a first script, wherein said first script encoding is a national script encoding; and a second database containing second host information pertaining to said host name, said second host information retrieved from said second database via a second key, said second key comprising at least said host name encoded in a second script.

13. A domain name system for deriving host information pertaining to a host name comprising:

a first database containing first host information pertaining to said host name, said first host information retrieved from said first database via a first key, said first key comprising at least said host name encoded in a first script; and a second database containing second host information pertaining to said host name, said second host information retrieved from said second database via a second key, said second key comprising at least said host name encoded in a second script, wherein said second script encoding is a universal script encoding.

14. A domain name system for deriving host information pertaining to a host name comprising:

a first database containing first host information pertaining to said host name, said first host information-retrieved from said first database via a first key, said first key comprising at least said host name-encoded in a first script;

a second database containing second host information pertaining to said host name, said second host information retrieved from said second database via a second key, said second key comprising at least said host name encoded in a second script; and wherein said first host information includes said second key information.

15. A domain name system for deriving host information pertaining to a host name comprising:

a first database containing first host information pertaining to said host name, said first host information retrieved from said first database via a first key, said first key comprising at least said host name encoded in a first script; and a second database containing second host information pertaining to said host name, said second host information retrieved from said second database via a second key, said second key comprising at least said host name encoded in a second script, wherein said second host information includes information selected from the set comprising internet protocol address, domain server and computer host specifications.

16. A domain name system for deriving host information pertaining to a host name comprising:

a first database containing first host information pertaining to said host name, said first host information retrieved from said first database via a first key, said first key comprising at least said host name encoded in a first script;

a second database containing second host information pertaining to said host name, said second host-information retrieved from said second database via a second key, said second key comprising at least said host name encoded in a second script; and wherein said first database further comprises a plurality of national encoding databases, said first key further comprises a plurality of national encoding keys containing at least said host name encoded in each of said scripts in a plurality of national script encodings corresponding to each database of said plurality of national encoding databases.

* * * * *